(12) United States Patent
Sol (10) Patent No.: US 11,964,905 B2
(45) Date of Patent: Apr. 23, 2024

(54) COATED GLAZING

(71) Applicant: ACR II GLASS AMERICA INC., Nashville, TN (US)

(72) Inventor: Jean-Marc Sol, Thionville (FR)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 17/716,536

(22) Filed: Apr. 8, 2022

(65) Prior Publication Data
US 2022/0324754 A1 Oct. 13, 2022

Related U.S. Application Data

(60) Provisional application No. 63/172,999, filed on Apr. 9, 2021.

(51) Int. Cl.
*C03C 17/36* (2006.01)
*C03C 27/10* (2006.01)

(52) U.S. Cl.
CPC .......... *C03C 17/3655* (2013.01); *C03C 27/10* (2013.01); *C03C 2217/256* (2013.01); *C03C 2217/948* (2013.01); *C03C 2218/328* (2013.01)

(58) Field of Classification Search
CPC ............... C03C 17/3655; C03C 27/10; C03C 2217/256; C03C 2217/948; C03C 2218/328
USPC ........................................................ 428/203
See application file for complete search history.

(56) References Cited

U.S. PATENT DOCUMENTS

| | | | |
|---|---|---|---|
| 2015/0229030 A1 | 8/2015 | Dai et al. | |
| 2018/0098386 A1 | 4/2018 | Masschelein et al. | |
| 2022/0388901 A1* | 12/2022 | Boote | ........................ C03C 8/18 |

FOREIGN PATENT DOCUMENTS

| | | | | |
|---|---|---|---|---|
| WO | 2004051870 A2 | 6/2004 | | |
| WO | 2004093497 A1 | 10/2004 | | |
| WO | WO-2019143597 A1 * | 7/2019 | ........... | B23K 26/364 |
| WO | WO-2019147605 A1 * | 8/2019 | ............... | B32B 1/00 |
| WO | 2021027269 A1 | 2/2021 | | |
| WO | 2021207620 A1 | 10/2021 | | |
| WO | 2021242994 A1 | 12/2021 | | |

OTHER PUBLICATIONS

Extended European Search Report for related European Application No. 22167495.5; action dated Jan. 4, 2023; (10 pages).
Office Action for related European Application No. 22167495.5; action dated Aug. 31, 2022; (4 pages).

* cited by examiner

*Primary Examiner* — Betelhem Shewareged
(74) *Attorney, Agent, or Firm* — K&L Gates LLP (57) ABSTRACT

A glazing includes a first substrate and a heatable coating formed on the first substrate, and the heatable coating includes at least one heatable layer and at least one deletion substantially enclosing a non-deleted portion of the heatable coating for increasing resistance against current flowing through the heatable coating.

18 Claims, 10 Drawing Sheets

COATED GLAZING

CROSS REFERENCE TO RELATED APPLICATION

This application claims priority to U.S. Provisional Application No. 63/172,999 filed on Apr. 9, 2021, entitled "Coated Glazing" the entire contents of which are incorporated by reference herein in their entirety.

TECHNICAL FIELD

The present disclosure generally relates to a glazing having a heatable coating with deletion regions.

BACKGROUND

Glazings, including those which may be used in a vehicle, may include a heatable coating thereon. A heatable coating may be used, for example, to defrost a glazing, including an area where a wiper sits against a windshield. In a vehicle, heatable coatings may be used on any suitable glazing, such as a windshield, rear window, sunroof, or side window. In some glazings, it may be preferable to provide a localized area of increased heating. For example, it may be preferable to heat an area of a windshield adjacent to a wiper more than other parts of the glazing. Increasing heat around such a wiper park area may allow for deicing around the wiper to allow the wiper to function. As a further example, it may be preferable to heat an information acquisition area of a windshield through which an information acquisition system such as a camera or sensor collects information from outside of a vehicle. Increasing heat around such a camera opening area may allow for deicing or defogging where fogging may interfere with the collection of clear information.

SUMMARY OF THE DISCLOSURE

Disclosed herein is a glazing comprising a first substrate and a heatable coating formed on the first substrate, the heatable coating including at least one heatable layer including at least one deletion at least substantially enclosing a non-deleted portion of the heatable coating. In some embodiments, the first substrate may be a first glass substrate. The first glass substrate may be laminated to a second glass substrate with an interlayer between the first glass substrate and the second glass substrate.

In an embodiment of the present disclosure, the deletion may extend in any of a rectangular shape, square shape, triangular shape, wedge-shape, circular shape, oval shape, U-shape, V-shape, or W-shape. The deletion may provide a differential heating of the first substrate. The deletion may be formed from a total coating deletion or a partial coating deletion. The deletion may be in an area for a wiper park, in an area surrounding an information acquisition area, or in an information acquisition area. The deletion may be formed in a region at which no black print is provided, or in a region at which black print is provided.

In another embodiment of the present disclosure, the heatable layer may include silver or a transparent conductive oxide. Multiple busbars may be provided to supply power to the heatable coating, and may be positioned on left and right sides of the glazing or top and bottom sides of the glazing. The busbar may be provided on each side, and each busbar may be made into multiple parts. The deletion may extend in a parallel direction to a shortest line connecting two busbars.

The heatable coating may be divided into multiple heatable sub-regions electrically isolated from each other. The heatable sub-regions may be horizontally divided and each heatable sub-region may extend horizontally from side to side. The heatable sub-regions may be formed with busbars for supplying power to the heatable sub-regions. The busbars may be divided into multiple sub busbars on each side. The sub busbars may supply power to the heatable sub-regions, respectively. One of the heatable sub-regions may be formed with a deletion in an area for a wiper park.

In some embodiments of the present disclosure, the first substrate may be a film substrate, which may be laminated between a first glass substrate and a second glass substrate. The film substrate may be formed of polyethylene terephthalate. The first glass substrate may be laminated to a second glass substrate with an interlayer between the first glass substrate and the second glass substrate. In some embodiments, the deletions may entirely enclose non-deleted portions of the heatable coating.

In another aspect of the present disclosure, disclosed herein is a method of providing a glazing with a heatable coating, comprising: providing a first substrate formed with a heatable coating thereon; and deleting a heatable layer in the heatable coating to provide a deletion substantially enclosing a non-deleted portion of the heatable coating. The deletion may be formed by applying a laser to the heatable coating, which may induce abrasion of the heatable coating by laser beam application.

In some embodiment, the disclosed method may include bending the first substrate with the heatable coating before the step of deleting; and laminating the first substrate with a second substrate with an interlayer between the first and second substrates after the step of deleting.

Alternatively, the method may include bending the first substrate with the heatable coating after the step of deleting, and laminating the first substrate with a second substrate with an interlayer between the first and second substrates after the step of bending.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth in order to promote a thorough understanding of one or more aspects of the disclosure. It may be evident in some or all instances, however, that many aspects described below can be practiced without adopting the specific design details described below.

Where a heatable coating is functional across an entire windshield or substantially all of the windshield, areas of differential heating may be formed with deleted regions separating the coating into electrically isolated portions with separate busbars for each isolated coating area. However, it may be preferable to minimize the number of busbars and electrical connections required. For example, it may be preferable to provide a heatable glazing having two busbars and differential heating across the glazing without requiring electrically isolated portions. In this specification, the term of "deletion region" may refer to a region at which a deletion or a recess may be formed by application of laser abrasion or any other physically deleting means. The terms of "top" and "bottom" designate edges of the glazing respectively when assembled in the vehicle.

Heatable coatings may include one or more heatable layers and may include dielectric layers between heatable layers where there is more than one heatable layer in the coating. In some embodiments of the present disclosure, a heatable coating may include one or more heatable layers. The heatable layers may be electrically connectable and heated when powered by a power source. A heatable coating may include a metallic coating, such as an infrared reflective coating. The metallic layers may preferably be silver containing layers. The silver containing layer may have a silver content of 90 mass % or more. Example heatable coatings may comprise a sequence of layers as follows: dielectric layer/silver/dielectric layer or dielectric layer/silver/dielectric layer/silver/dielectric layer. The dielectric layers may comprise metal oxides, nitrides or oxynitrides, for example, tin oxide, zinc oxide, silicon nitride, titanium oxide, aluminum oxide, or mixtures of one or more thereof. In certain embodiments, a heatable coating may include a transparent conductive oxide (TCO) coating, such as a Low-E coating. A TCO coating may include at least one TCO layer, such as Indium Tin Oxide (ITO) layer(s), as the heatable layers, which may be separated by dielectric layers. The thickness of a metallic layer may be from 1 nm to 100 nm, preferably 5 nm to 50 nm, more preferably 8 nm to 30 nm. The thickness of a dielectric layer may be 1 nm to 100 nm, preferably 5 nm to 50 nm, more preferably 8 nm to 30 nm. The thickness of a TCO layer may be from 1 nm to 200 nm, preferably 10 nm to 150 nm, more preferably 20 nm to 100 nm. The heatable coating, having any suitable heatable layers, may be provided in a laminated glazing. Preferably, the heatable coating may be on a glass surface in the glazing or a film laminated within the glazing. The visible light transparency of the glazing or the laminated glazing may be 70% or more, preferably 72% or more, to satisfy regulatory requirements. Visible light transparency may particularly be determined by ISO 3538:1997, "Road vehicles—Safety glazing materials—Test methods for optical properties." To measure light transmission across a wavelength spectrum or at a particular wavelength, any suitable equipment complying with the ISO standard may be used, such as a UV-Vis Spectrophotometer (e.g., U4000, Hitachi High-Tech Science).

A laminated glazing may include a first glass substrate and a second glass substrate laminated together with an interlayer material therebetween. The thickness of the glass substrates is not particularly limited, but is preferably from 0.5 mm to 3.0 mm. The glass substrates may include, without limitation, soda-lime silicate glass described by ISO 16293-1:2008. Particularly, an interlayer may be a polymer adhesive, such as polyvinyl butyral (PVB), ethylene vinyl acetate (EVA) or an ionomer. A heatable coating may be provided on a glass substrate or a film, such as polyethylene terephthalate. Where the heatable coating is provided on a film, the film may be laminated between first and second glass substrates. A heatable coating on a glass substrate may be formed on the glass substrate prior to lamination. In the laminated glazing, the heatable coating may be protected from corrosion from exposure to external elements. In some embodiments, the coating may be deleted around an edge of the glass substrate.

The heatable coating may be connected to a power source via busbars formed on the coating. Preferably, the coating includes two busbars formed opposite each other, such that electrical current may pass across the coating between the busbars. The busbars may be made, for example, by printing a conductive paste on a coating formed on a glass substrate, in particular by the screen-printing method, which may be fired, for example, during bending of the glass substrate. The busbars may, for example, be implemented as strip-shaped or band-shaped electrodes. The busbars may include a thin, narrow metal foil strip of copper or aluminum, for instance, which include a conductive adhesive layer, applied with electrical contact to the heatable coating. The adhesive foil strip may be attached over a conductive paste material formed on the heatable coating.

Where it is preferable to variably heat the coating, such as for a wiper park area, the coating according to the present disclosure may include deletions substantially enclosing portions of the coating. A deletion may enclose entirely a non-deleted portion of the heatable coating or may enclose most of a non-deleted portion of the heatable coating which slightly connects to the outside of the deletion. The deletions may extend in a parallel direction to a shortest line connecting two busbars to create a narrow conductive channel for electric current between deletions. The deletions may locally increase resistance in the coating such that the amount of heat generated by ohmic resistance heating increases to enable faster deicing and/or defogging. The electric current may be locally forced through narrow and/or long stretches due to the deletions which may locally increase the electrical resistance. The increased resistance may cause the coating to locally heat more than areas of the coating with no deletions.

The deletions may be made by application of a laser or any other means of removal from the heatable coating. The deletions may be formed in any suitable shape substantially enclosing a non-deleted coated area. When the deletion entirely encloses a non-deleted portion, the deletion may be rectangular, square, triangular, wedge-shape, circular, oval etc. When the deletion encloses most of a non-deleted portion, the deletion may be U-shape, V-shape, W-shape etc. The enclosures may be the same or different in shape and may be parallel to each other or not. In a typical formation, a number of deletions may be provided parallel to each other, where each deletion may have a rectangular or substantially rectangular pattern enclosing a non-deleted portion inside. Example enclosures and busbars are shown in FIGS. 3 to 6. Deletions may preferably be 0.05 mm to 1.5 mm, more preferably 0.08 mm to 1 mm, in width where the deletion is formed by laser abrasion in a drawing manner. Shape, width, length, and/or interval may be varied depending on a purpose/location of heating. As illustrated in the FIGS. 3 to 6, example enclosures may have elongated shapes or more rounded shapes. Smaller islands may provide more heating homogeneity than relatively large islands, so the size should be relative to the desired heating homogeneity across the coating area. The enclosed portions of the heatable coating within the deletions may be electrically isolated from the rest of the coating. The total heat of the coating area with deletions and enclosures may be controlled by the density of the enclosures. The density of the enclosures, which may be represented by a ratio of non-enclosed coating to total coating surface, may be controlled locally in some embodiments to provide a gradient pattern of heating in the heatable coating.

The area of a coating having deletions may be any suitable shape and size. In some embodiments, an area having deletions may extend across all or part of a bottom portion of a glazing. The area having deletions may include multiple areas of deleted coating. For example, a vehicle may include two wipers positioned on a windshield and a windshield coating may preferably heat areas of the windshield corresponding to each wiper position. Such a windshield may also include an information acquisition area, and an area surrounding the information acquisition area. The information acquisition area is an area through which light or other physical data are received by devices such as camera or sensors. The area surrounding the information acquisition area is a margin area for reducing noise entering to the devices. The deletion may be formed in a region at which no black print is provided. As an example, the deletion may be formed in the information acquisition area for receiving light for a camera. Alternatively, the deletion may be formed in a region at which black print is provided. As an example, the deletion may be formed in a manner overlapping the black print in the area surrounding the information acquisition area for receiving light for a camera.

Through application of a supplied voltage on the two busbars, both of the heatable coating with deletion regions and without deletion regions may be heated simultaneously. The coating with deletion regions may cause more heat than the coating without deletion regions. For example, the heatable coating without deletion regions may be configured such that with impingement by an on-board voltage of 12 to 48 V, a specific heating output of 3 to 6 watts/dm$^2$ is obtained. For example, the heatable coating with deletions may be configured such that with impingement by an onboard voltage of 12 to 48V, a specific heating output of S to 20 watts/dm$^2$ is obtained. Through application of a supplied voltage on the two busbars, the heatable coating areas with deletions and without deletions may be heated simultaneously. The coating area with deletions may heat more than the coating area without deletions.

Even where the heatable coating is divided into separate, electrically isolated sections, the present invention may allow for differential heating in a portion or portions of the heatable coating. In some embodiments, the heatable coating may be divided into multiple heatable sub-regions electrically isolated from each other. Such electrical isolation may be formed by dividing the conductive layer of the heatable coating. The heatable sub-regions may be horizontally divided and each heatable sub-region may extend horizontally from side to side across the windshield. This division may be suitable for differentiating heating temperature for an upper part used for most part of a windshield and a lower part for wiper park. The heatable sub-regions may be formed with busbars for supplying power to the heatable sub-regions. One or multiple of the sub-regions may include deletion regions to provide increased heating.

In some embodiments, the deletions may be formed using a laser. The laser may be absorbed by the coating and locally decompose said coating without affecting the underlying material. In certain embodiments, the laser may locally vaporize the coating. For the present description, the laser may be focused, with a suitable shape and size, on some coating layers. The preferable power and/or focus of a laser may be determined based on the coating materials and the number and thickness of layers to be deleted by the laser.

Laser power sources known in the art for laser deletion for an automotive glazing for electric sensor installation may be used. For example, equipment producing a pulsed green laser with a wavelength of 532 nm and frequency of 10 kHz may be used. In some embodiments, a continuous or pulsed infrared laser with a wavelength of 1059-1065 nm may be used. Moreover, power, pulsation and/or frequency may be periodically or non-periodically varied or scanned. Variation of laser focus during scanning with or without a Galvano scanner may be also used. For another example, laser processing technology with spatial phase modulator or holographic optics may be used. The laser processing may include interfering laser beams to create the deletion. Interfering lasers may provide a stable, energy efficient system over a focused laser beam. An axicon lens may be used to create the deleted openings described herein with interfering laser beams. Further, the interfering beams may be focused on the coating such that openings may be reliably formed on a three-dimensionally bent glass substrate.

In some further embodiments, a deletion may be formed by physical abrasion. For example, a grinding wheel may be applied to the coating to provide deletions in the coating.

Figure 1:
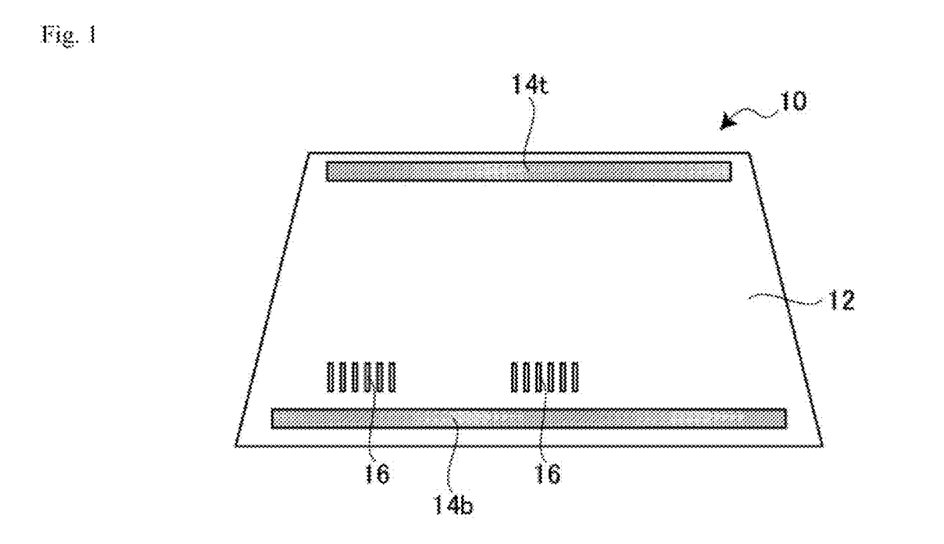
FIG. 1 is a plan view showing a glazing, according to an embodiment of the disclosure.
Figure 2:
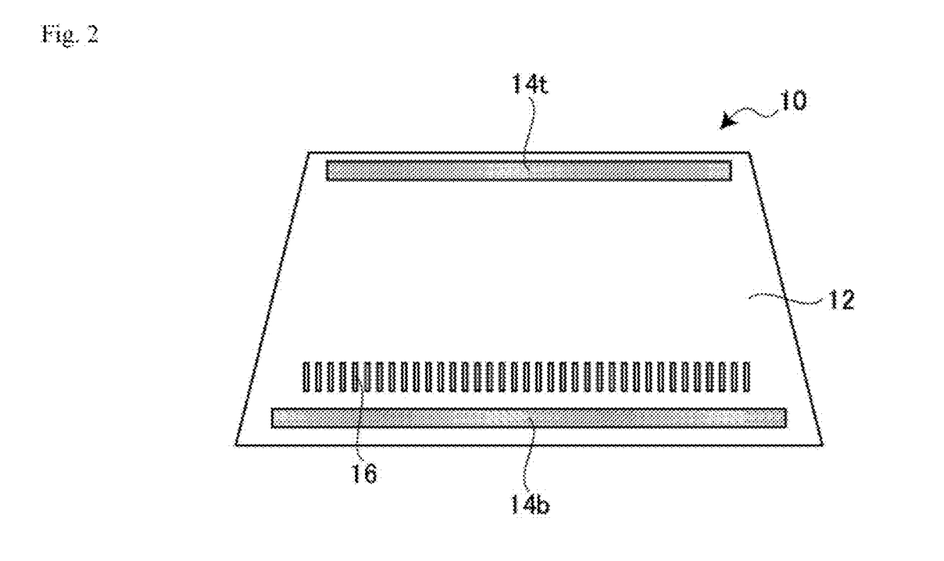
FIG. 2 is a plan view showing a glazing having another pattern of a deletion region, according to another embodiment of the disclosure.

FIG. 1 and FIG. 2 illustrate examples of glazings with heatable coatings of this disclosure. A windshield 10 may be formed with a heatable coating 12 as to cover almost an entire surface of the windshield 10. A pair of busbars 14*t*, 14*b* are provided on a top side and a bottom side, respectively, as extending along the edges of the top and bottom sides of the windshield 10. Deletions 16 are provided as a pair of deletion groups in FIG. 1 and a straight line of one deletion group in FIG. 2. Each deletion 16 is formed in a substantially enclosing manner and may extend in a rectangular shape as shown in FIG. 1 and FIG. 2. Portions that the deletions 16 are provided become areas at which current flows between the busbars 14t, 14b narrowly among the deletions 16. Because the electrical current flows through narrowed areas, the electric resistance increases, thereby generating more heat at the area of deletions 16.

Figure 3:
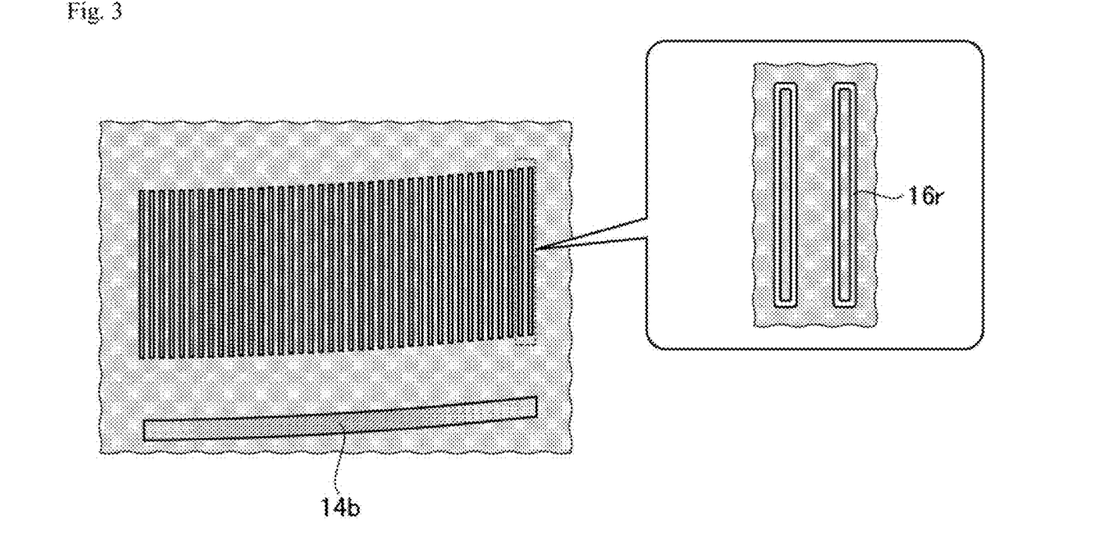
FIG. 3 is a plan view showing a part of a glazing according to an embodiment of the disclosure with an enlarged view showing deletions enclosing non-deleted portions and extending in a rectangular shape.
Figure 4:
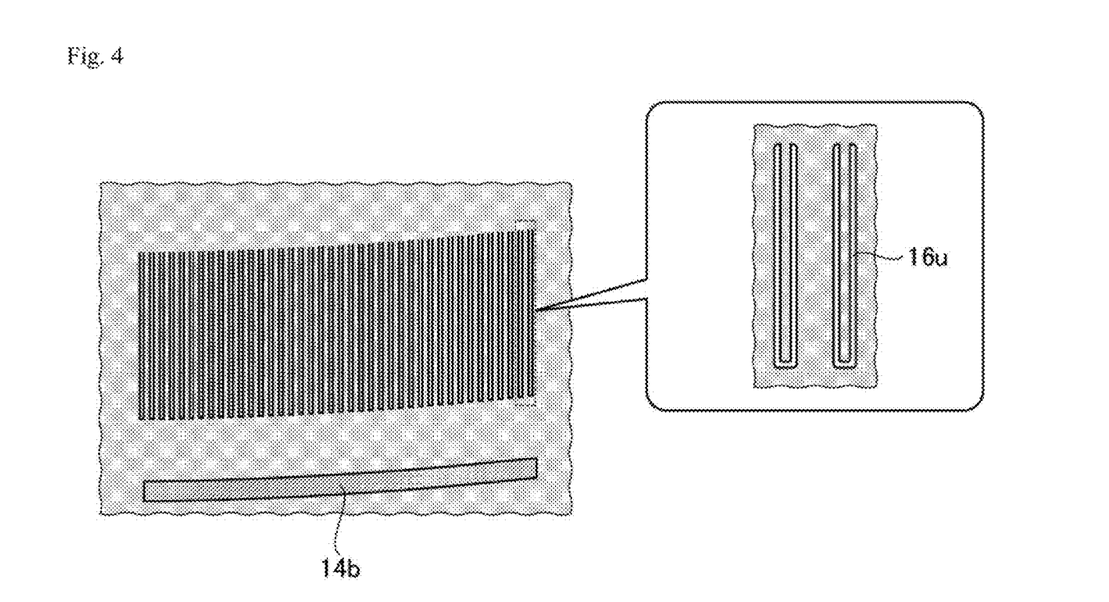
FIG. 4 is a plan view showing a part of a glazing according to an embodiment of the disclosure with an enlarged view showing deletions substantially enclosing non-deleted portions and extending in a U-shape.

FIG. 3 to FIG. 6 illustrate four types of deletions 16r, 16u, 16w, and 16c with a busbar 14b extending along the bottom edge of the windshield. Each of the deletions 16r, 16u, 16w, and 16c has a non-deleted portion inside. FIG. 3 shows the deletion 16r extending in a rectangular shape. The deletion 16r encloses a non-deleted portion extending longitudinally along the shape of the deletion 16r. The non-deleted portion does not contribute current path between the busbars, therefore increasing the resistance between the busbars. FIG. 4 shows the deletion 16u extending in a U-shape. The deletion 16u substantially encloses a non-deleted portion extending along the shape of the deletion 16u. Although the non-deleted portion connects to the heatable coating at a top of the portion, the non-deleted portion does not contribute to the current path between the busbars, therefore increasing the resistance between the busbars.

Figure 5:
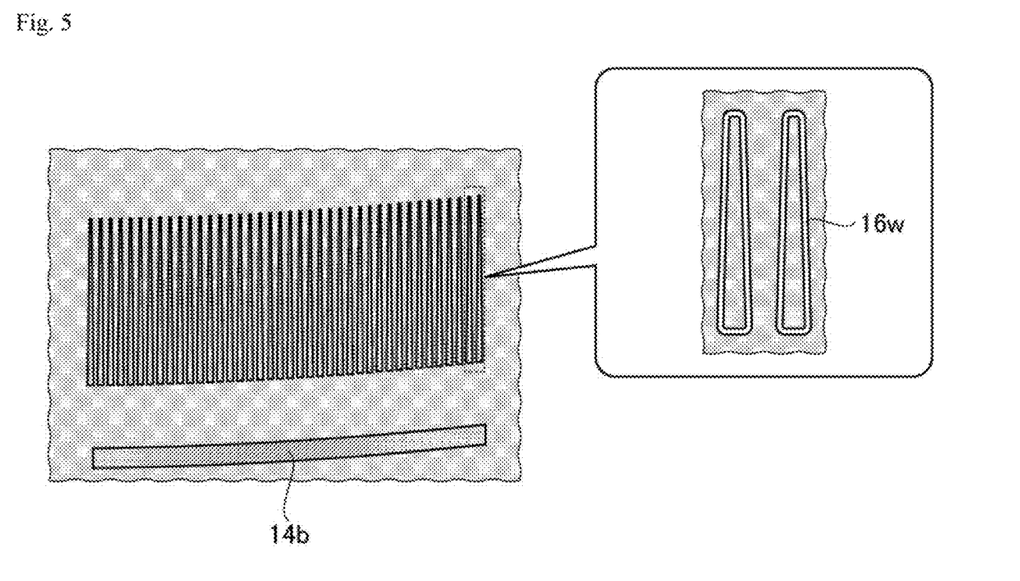
FIG. 5 is a plan view showing a part of a glazing according to an embodiment of the disclosure with an enlarged view showing deletions enclosing non-deleted portions and extending in a wedge shape.

FIG. 5 shows the deletion 16w extending in a wedge shape. The deletion 16w encloses a non-deleted portion longitudinally extending a wedge shape along the shape of the deletion 16w. The wedge shaped non-deleted portion does not contribute current path between the busbars, therefore increasing the resistance between the busbars. Where a thin end of the wedge shape orients the top side and a thick end of the wedge shape orients the bottom side, the narrowest portion of the current path may be formed near the bottom side of the deletion 16w, so that an area around the bottom side may generate more heat than the top side, thereby by creating heat profile gradually changing from the bottom to the top.

Figure 6:
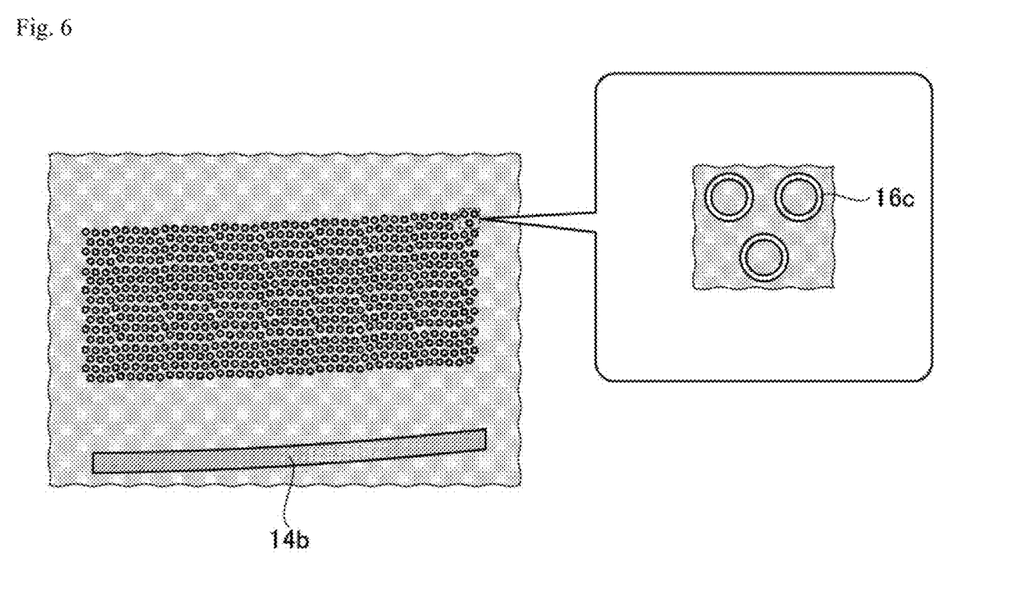
FIG. 6 is a plan view showing a part of a glazing according to an embodiment of the disclosure with an enlarged view showing deletions enclosing non-deleted portions and extending in a circular shape.

FIG. 6 shows the deletion 16c extending annularly. The deletion 16c encloses a non-deleted portion extending in a disc shape inside the deletion 16c. The non-deleted portion does not contribute current path between the busbars, therefore increasing the resistance between the busbars. With this deletion 16c, the density of the deletion 16c is a key to control the resistance between the busbars 14t, 14b. If the deletions 16c are provided at a high density, the resistance of the heatable coating becomes high, and to the contrary, if the deletions 16c are provided at a low density, the resistance of the heatable coating becomes low. The 16c may be formed with the same diameters or with different diameters. The deletions 16c may be formed in a manner not overlapping one another as shown in FIG. 6.

Figure 7:
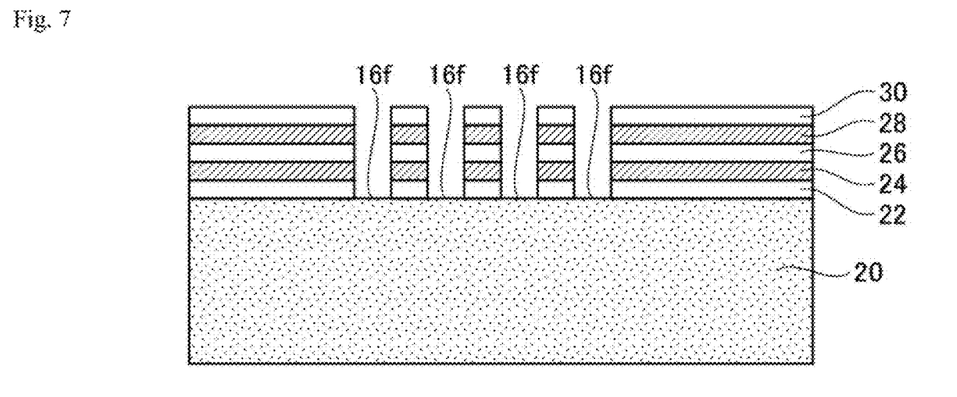
FIG. 7 is a cross section showing a glazing with a deletion region according to an embodiment of the disclosure.
Figure 8:
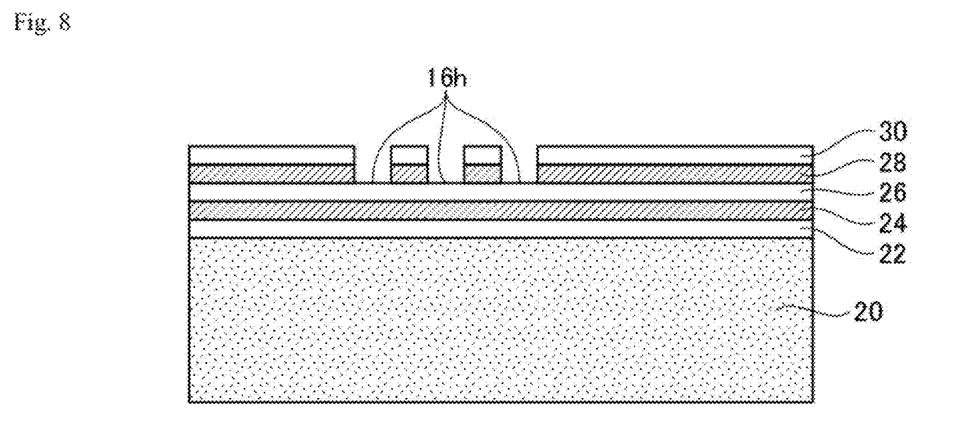
FIG. 8 is a cross section showing a glazing with another deletion region according to another embodiment of the disclosure.

FIG. 7 and FIG. 8 illustrate deletions 16f, 16h in a depth direction. Where the heatable coating has at least two conductive layers 24, 28 and three dielectric layers 22, 26, 30 stacked alternatively, the depth of the deletion may be controlled to be a complete or partial deletion, or namely the complete deletion 16f of the full depth of the coating shown in FIG. 7 or the partial deletion 16h of the partial depth of the coating shown in FIG. 8.

Figure 9:
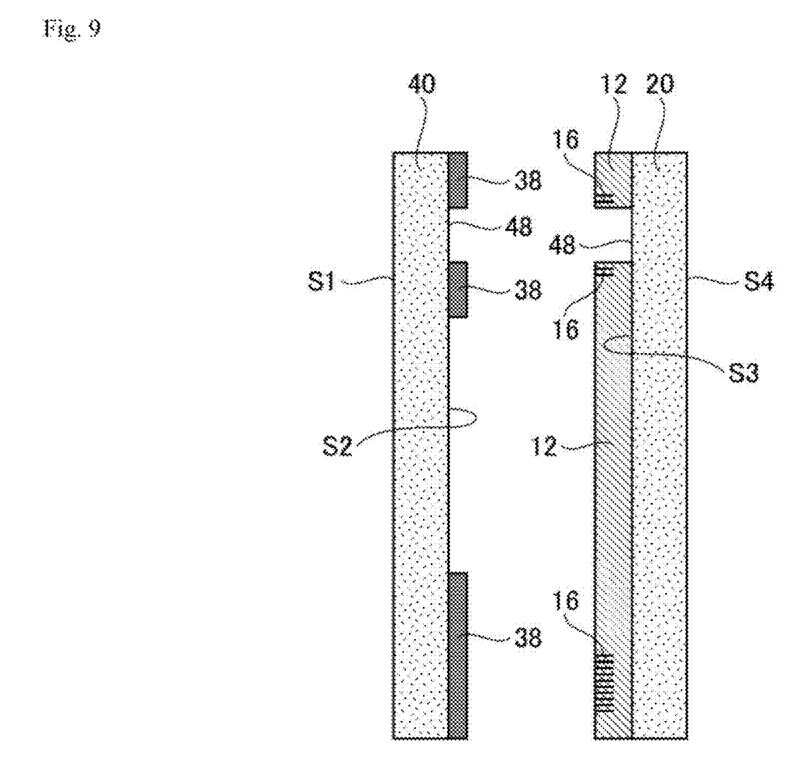
FIG. 9 is across section showing a structure of double glass sheets for a laminated glazing, according to an embodiment of the disclosure.
Figure 10:
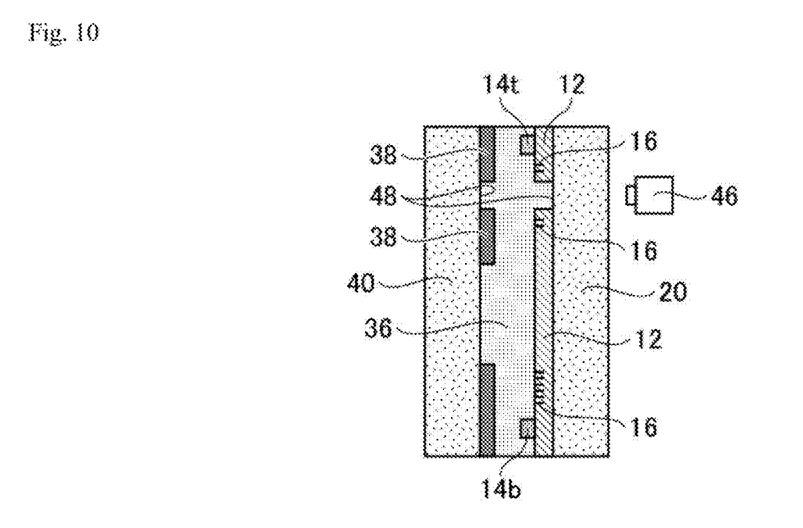
FIG. 10 is a cross section showing the laminated glazing shown in FIG. 9.
Figure 11:
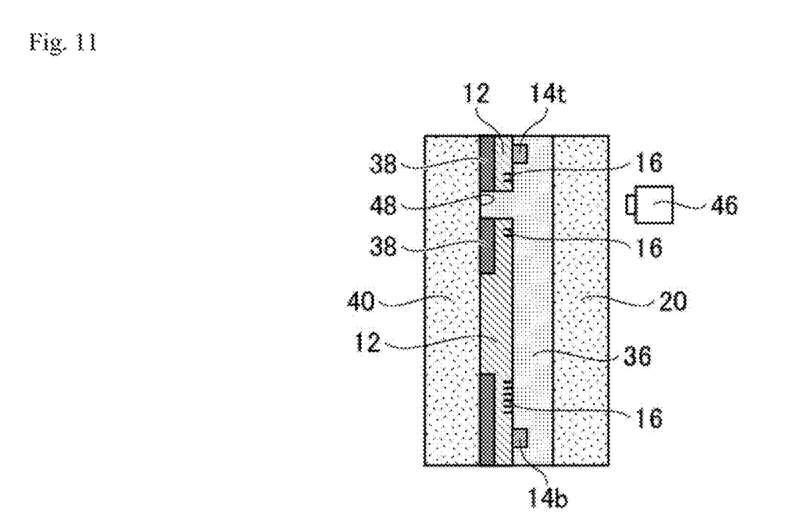
FIG. 11 is a cross section showing a laminated glazing, according to another embodiment of the disclosure.

FIG. 9 to FIG. 11 are cross sections illustrating windshields for a vehicle. FIG. 9 and FIG. 10 are process cross sections. In FIG. 9, a pair of glass substrates 20, 40 are provided, and the outer glass substrate 40 may be formed with black print regions 38 on the inner surface S2. The inner glass substrate 20 may be formed with a heatable coating 12. The heatable coating 12 is formed as covering the whole surface S3 except a window for a camera formed near the top of the inner glass substrate 20. The heatable coating 12 is formed with the deletions 16, near the window for a camera 48, at an area surrounding the information acquisition area, and with the deletions 16 at a bottom side for the wiper park areas.

After providing the deletions 16 to the heatable coating 12, a pair of busbars 14t, 14b are provided, and an interlayer 36 is provided for lamination of the pair glass substrates 20, 40, as shown in FIG. 10. Where the lamination is completed, the positions of the deletions 16 may overlap with black print regions 38, so that the black print regions 38 hide the deletions 16 effectively. A camera 46 may be aligned with the camera window 48 when installed in a vehicle.

FIG. 11 illustrates a modified example of the glazing. The heatable coating 12 may be formed on the surface S2 of the outer glass substrate 40. With this structure, the heatable coating 12 is arranged closer to the outer surface of the outer glass substrate 40, so that the wiper may be heated more effectively from the high resistance regions made by the deletions 16.

Figure 12:
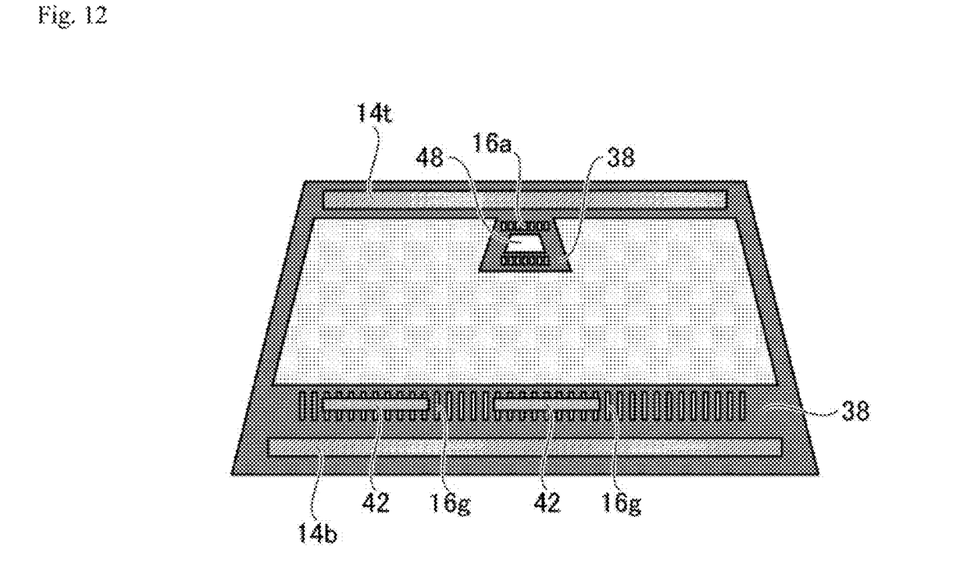
FIG. 12 is a plan view showing a glazing, according to an embodiment of the disclosure.

FIG. 12 to FIG. 17 show several examples of positions of the deletions 16a, 16g. In FIG. 12, the deletions 16a, 16g are provided in an area surrounding a camera window 48 and a bottom area for wiper park regions 42. The busbars 14t, 14b are arranged at the top and the bottom of the glazing, respectively. The deletions 16a extend vertically to the long axis of the glazing and are aligned horizontally in two lines on an upper side and a lower side of the camera window 48. The deletions 16g, each extending vertically to the long axis of the glazing, are also aligned in a line at the bottom area as to overlap with the wiper park regions 42. Those areas having the deletions 16a, 16g overlap the area of the black print area 38. Each deletion 16a, 16g works to increase the resistance against the current flowing between the busbars 14t, 14b.

Figure 13:
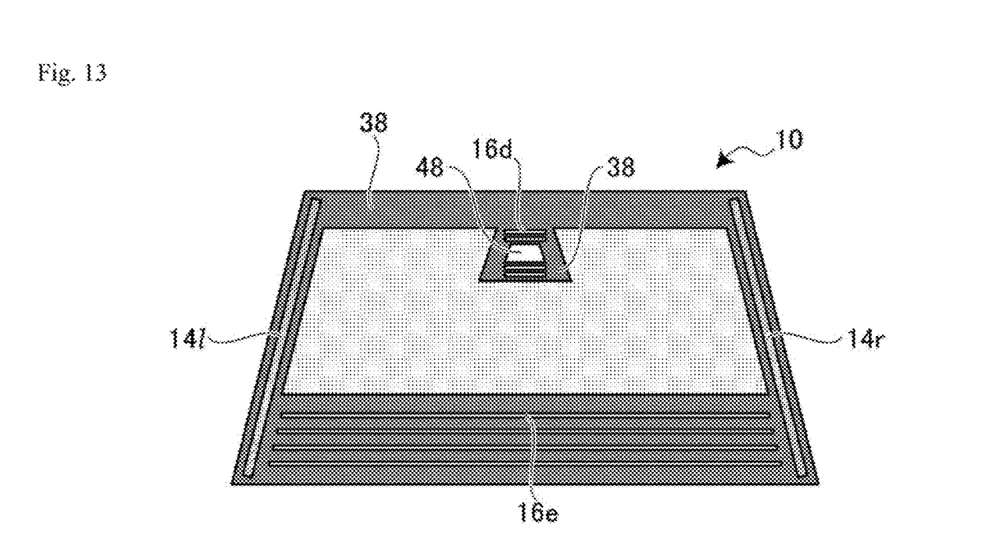
FIG. 13 is a plan view showing a glazing, according to another embodiment of the disclosure.

FIG. 13 shows another example of positions of the deletions 16d, 16e. In FIG. 13, the busbars 14l, 14r are provided on a left edge and a right edge of the glazing to supply the current to the heatable coating. The deletions 16d extend horizontally along the long axis of the glazing and are aligned in two areas, on an upper area and a lower area of the camera window 48. The deletions 16e, each extending horizontally to the long axis of the glazing, are also aligned at the bottom area of the glazing as to overlap with the wiper park regions, not shown. Those areas having the deletions 16d, 16e overlap with the black print area 38. Each of the deletions 16d, 16e works to increase the resistance against the current flowing between the busbars 14l and 14r.

Figure 14:
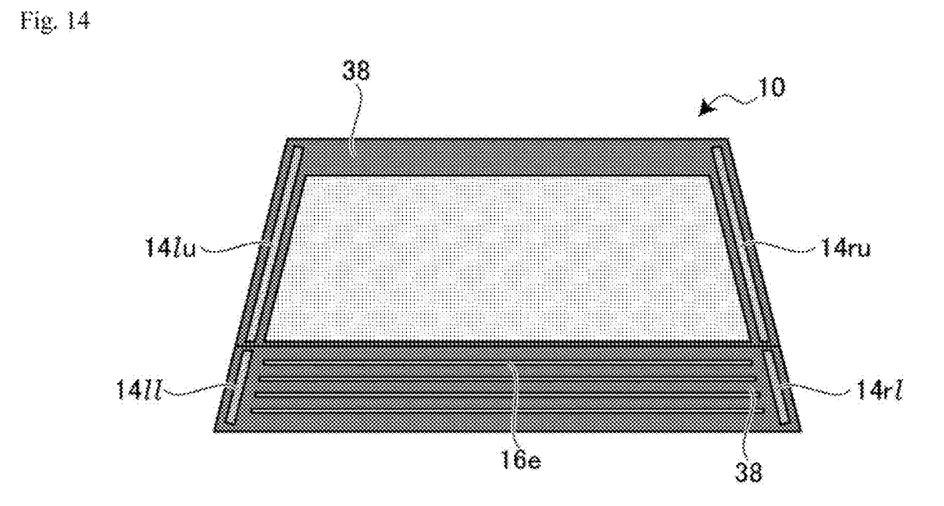
FIG. 14 is a plan view showing a glazing, according to yet another embodiment of the disclosure.

FIG. 14 shows yet another example of positions of the deletions 16e. In FIG. 14, two pairs of the busbars 14lu, 14ru and 14ll, 14rl are provided on a left edge and a right edge to supply the current to the heatable coating in two sub-regions of the heatable coating. The busbars 14lu, 14ru may be arranged on respective sides of the window of the windshield. The busbars 14ll, 14rl are arranged on respective sides of the bottom area of the windshield. The deletions 16e extend horizontally along the long axis of the glazing at the bottom area as to overlap the area of the black print area 38. Each of the deletions 16c works to increase the resistance against the current flowing between the busbars 14ll and 14rl.

Figure 15:
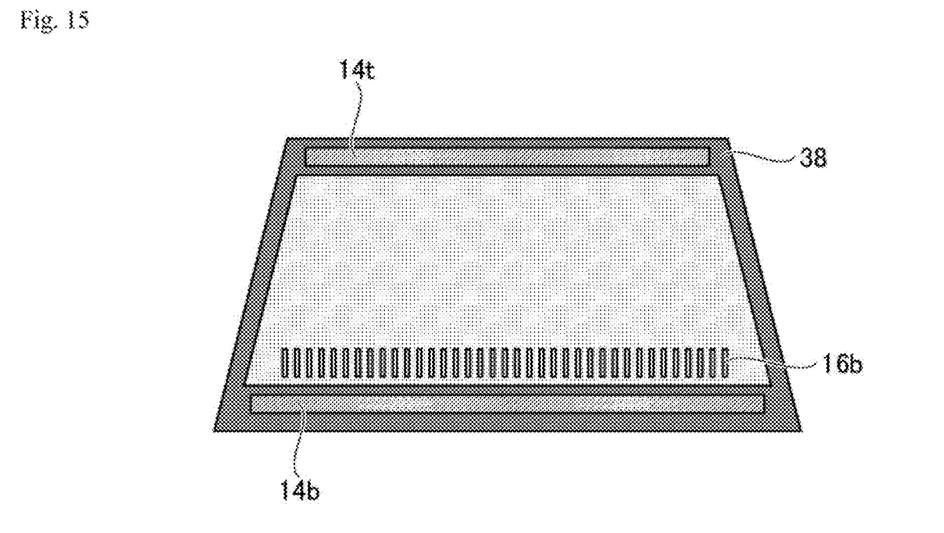
FIG. 15 is a plan view showing a glazing, according to still another embodiment of the disclosure.

FIG. 15 shows an example of positions of the deletions 16b. The busbars 14t, 14b are arranged at the top and the bottom of the glazing, respectively. The deletions 16b extend vertically to the long axis of the glazing as to be aligned horizontally in a line at the bottom area. The deletions 16*b* may overlap with the wiper park regions, not shown. Alternatively to the example shown above, the area having the deletions 16*b* does not overlap the black print area 38. Each deletion 16*b* works to increase the resistance against the current flowing between the busbars 14*t*, 14*b*.

Figure 16:
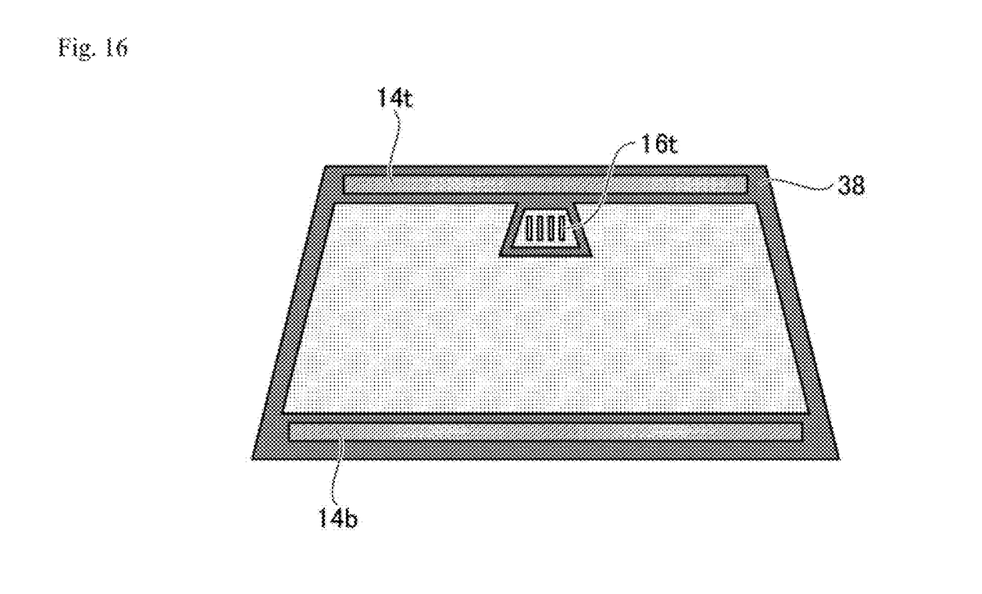
FIG. 16 is a plan view showing a glazing, according to a further embodiment of the disclosure.
Figure 17:
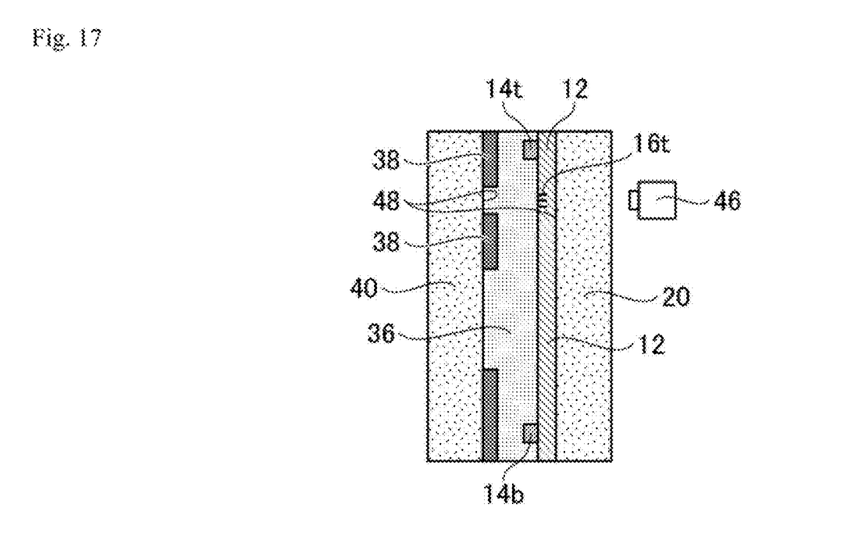
FIG. 17 is a cross section showing a laminated glazing, according to further another embodiment of the disclosure.

FIG. 16 shows another example of positions of the deletions 16*t*. The busbars 14*t*, 14*b* are arranged at the top and the bottom of the glazing, respectively. The deletions 16*t* are arranged in a vertically extending manner as to be aligned within the window for a camera. Alternatively to the example shown in FIG. 12 and FIG. 13, the area having the deletions 16*t* does not overlap the area of the black print area 38. Each deletion 16*t* works to increase the resistance against the current flowing between the busbars 14*t*, 14*b*. FIG. 17 shows a cross section of the glazing shown in FIG. 16. Moreover, deletions 16*b* or 16*g* may be added to the bottom area of the glazing.

The deletions shown in FIG. 13 to FIG. 17 are formed to extend along the current line flowing between the busbar pair.

Figure 18:
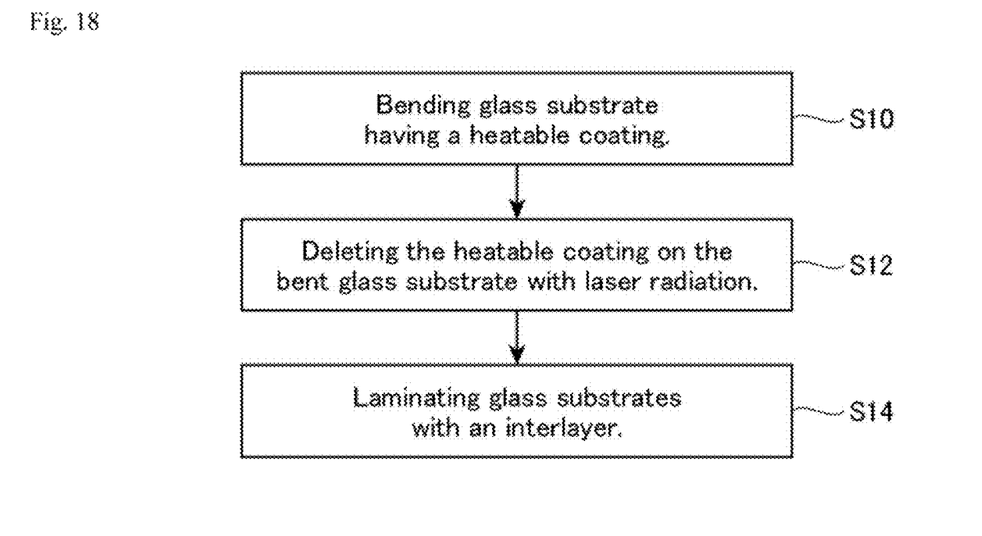
FIG. 18 is a flowchart showing a method of providing a glazing, according to an embodiment of the disclosure.
Figure 19:
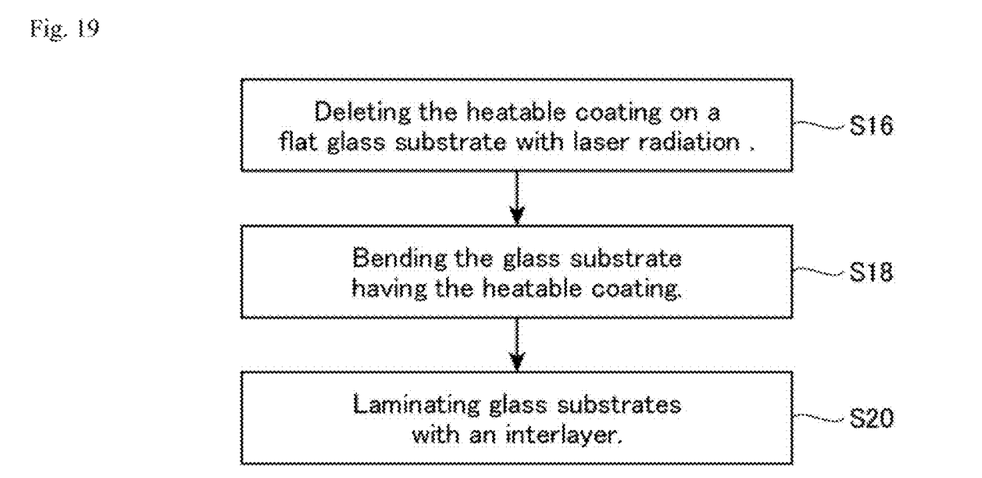
FIG. 19 is a flowchart showing a method of providing a glazing, according to another embodiment of the disclosure.

FIG. 18 and FIG. 19 illustrate examples of process flows according to the disclosure. According to the process flow shown in FIG. 18, a heatable coating is formed on a glass substrate, and the glass substrate with the heatable coating is bent at Step S10. After bending the glass substrate, the heatable coating is deleted with laser radiation to form the deletions in the heatable coating at Step S12. After forming the deletions in the heatable coating, the glass substrate is overlapped to another glass substrate with an interlayer between the glass substrates, and the overlapped glass substrates are laminated in an autoclave at Step S14. In this process flow, the deletion is made after bending the glass substrate.

In another process flow shown in FIG. 19, a flat glass substrate is prepared, and a heatable coating is formed on the flat glass substrate. After the heatable coating is formed, the laser radiation produces the deletions in the heatable coating by deleting the heating coating at Step S16. After forming the deletion, the flat glass is bent in heat application at Step S18. After bending the glass substrate, the glass substrate is overlapped to another glass substrate with an interlayer between the glass substrates, and the overlapped glass substrates are laminated in an autoclave at Step S20. In this process flow, the deletion is made before bending the glass substrate.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A glazing, comprising:
   a first substrate; and
   a heatable coating formed on the first substrate, the heatable coating including:
   at least one heatable layer, and
   at least one deletion,. the at least one deletion being an opening in the heatable coating to interrupt any electric current flowing through the heatable coating and, the at least one deletion at least substantially enclosing a non-deleted portion of the heatable coating;
   wherein multiple busbars for supplying power to the heatable coating are positioned on the heatable coating and wherein the busbars are positioned on left and right sides of the glazing or top and bottom sides of the glazing, the multiple busbars being remote from the at least one deletion.

2. The glazing according to claim 1, wherein the first substrate is a first glass substrate.

3. The glazing according to claim 2, wherein the first glass substrate is laminated to a second glass substrate with an interlayer between the first glass substrate and the second glass substrate.

4. The glazing according to claim 1, wherein the deletion extends in any of a rectangular shape, square shape, triangular shape, wedge-shape, circular shape, oval shape, U-shape, V-shape, or W-shape.

5. The glazing according to claim 1, wherein the at least one deletion is in an area for a wiper park.

6. The glazing according to claim 1, wherein the at least one deletion is in an area surrounding an information acquisition area.

7. The glazing according to claim 1, wherein the at least one deletion is formed in an information acquisition area.

8. The glazing according to claim 1, wherein the deletion is formed in a region at which black print is provided.

9. The glazing according to claim 1, wherein the heatable layer includes silver.

10. The glazing according to claim 1, wherein the heatable layer includes a transparent conductive oxide.

11. The glazing according to claim 1, wherein the deletion extends in a parallel direction to a shortest line connection two busbars.

12. The glazing according to claim 1, wherein the first substrate is a film substrate, wherein the film substrate is laminated between a first glass substrate and a second glass substrate.

13. The glazing according to claim 12, wherein the film substrate is formed of polyethylene terephthalate.

14. A method of providing a glazing with a heatable coating, the method comprising:
    providing a first substrate formed with a heatable coating thereon; and
    deleting a heatable layer in the heatable coating to provide a deletion being an opening in the heatable coating to interrupt any electric current flowing through the heatable coating and, the at least one deletion at least substantially enclosing a non-deleted portion of the heatable coating
    positioning multiple busbars for supplying power to the heatable coating on the heatable coating, wherein the busbars are positioned on left and right sides of the glazing or top and bottom sides of the glazing, the multiple busbars being remote from the opening.

15. The method according to claim 14, wherein deleting the portion of the heatable layer comprises applying a laser to the heatable coating.

16. The method according to claim 14, wherein the deletion extends in any of a rectangular shape, square shape, triangular shape, wedge-shape, circular shape, oval shape, U-shape, V-shape, or W-shape.

17. The method according to claim 14, further comprising:
- bending the first substrate with the heatable coating before the step of deleting; and
- laminating the first substrate with a second substrate with an interlayer between the first and second substrates after the step of deleting.

18. The method according to claim 14, further comprising:
- bending the first substrate with the heatable coating before the step of deleting; and
- laminating the first substrate with a second substrate with an interlayer between the first and second substrates after the step of bending.

* * * * *